May 17, 1949.    C. H. SCHLESMAN    2,470,745
MASS SPECTROMETER
Filed May 15, 1945    2 Sheets-Sheet 2
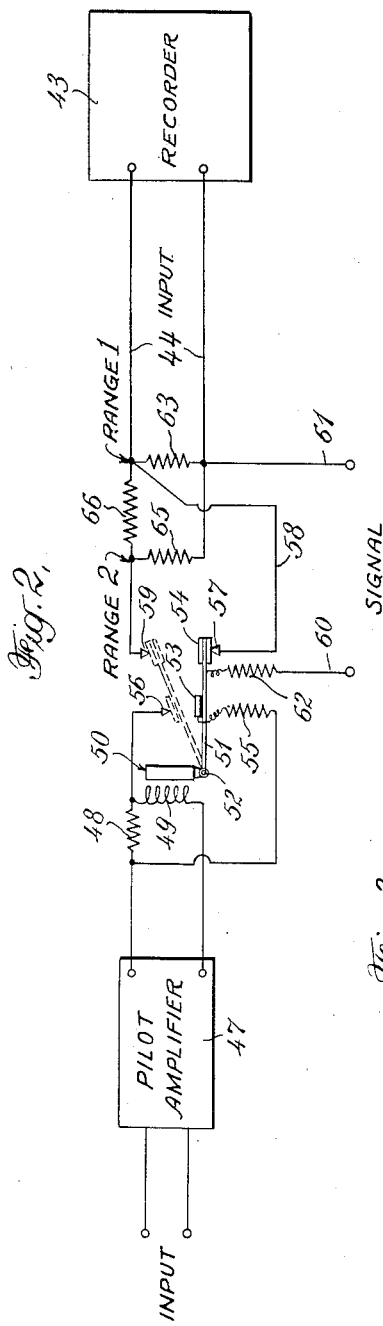
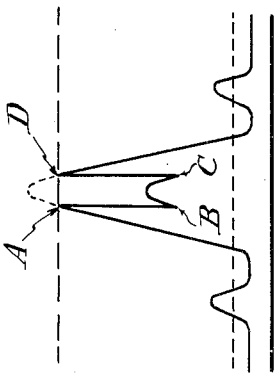
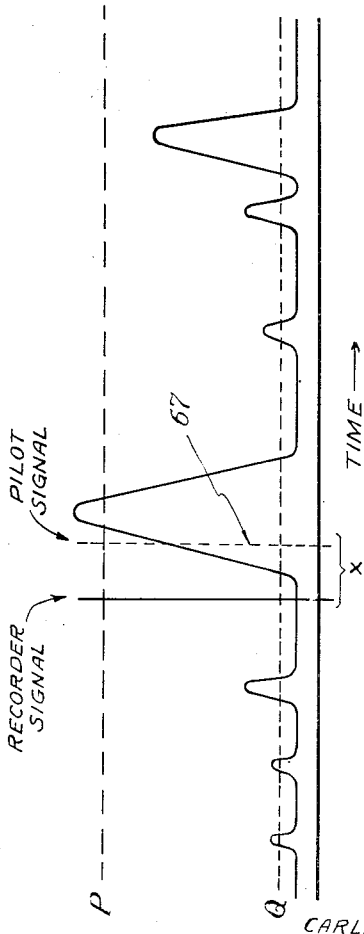
INVENTOR
CARLETON H. SCHLESMAN
BY James Y. Cleveland
ATTORNEY Patented May 17, 1949

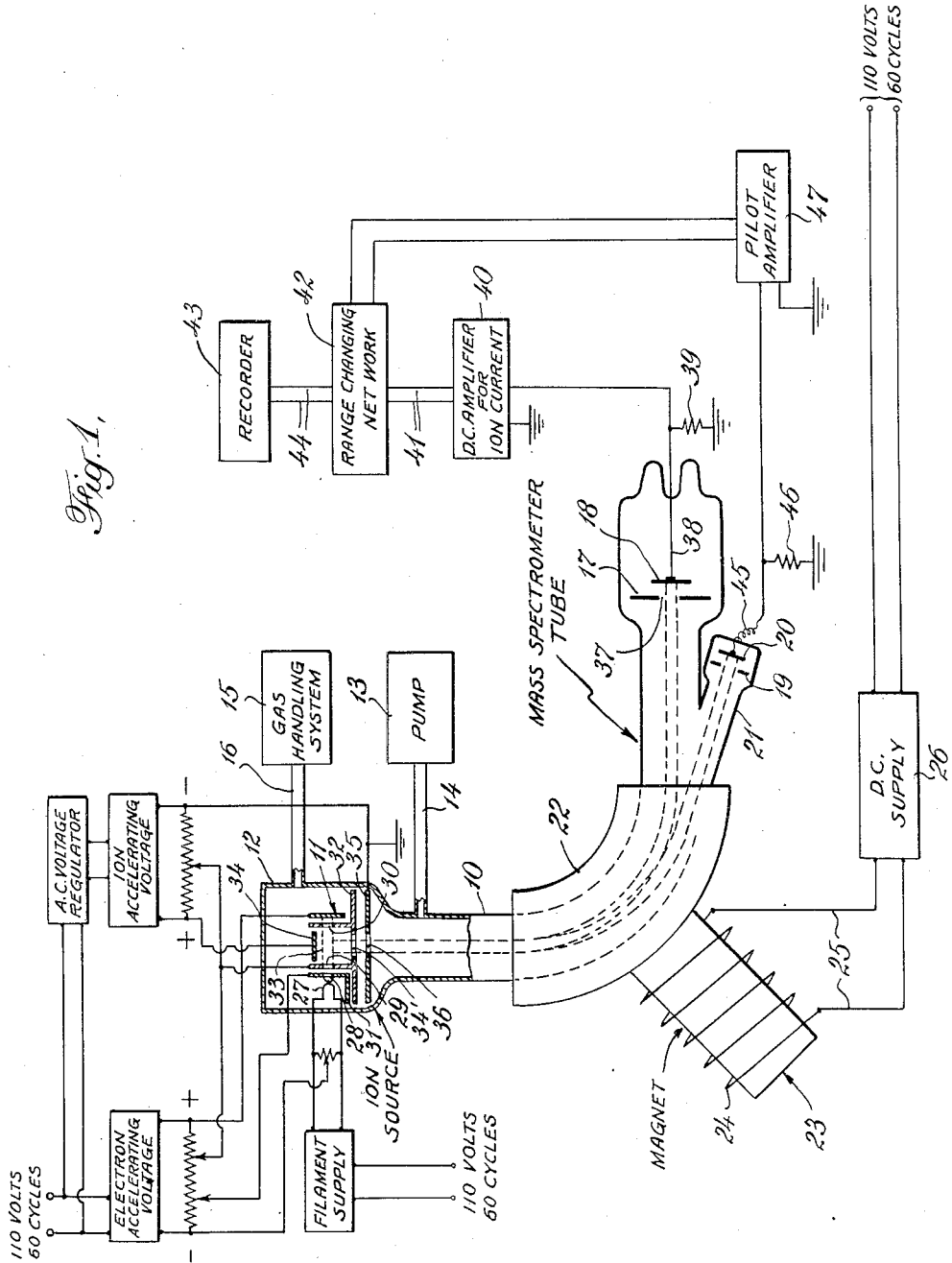

2,470,745

UNITED STATES PATENT OFFICE 2,470,745

MASS SPECTROMETER

Carleton H. Schlesman, Camden, N. J., assignor to Socony-Vacuum Oil Company, Incorporated, a corporation of New York Application May 15, 1945, Serial No. 593,952

11 Claims. (Cl. 250—41.9)

This invention relates generally to the art of chemical analysis of mixtures such as petroleum hydrocarbons and more particularly to a novel mass spectograph by means of which such analysis can be made.

The analysis of petroleum hydrocarbons has become an extremely important process within the petroleum industry. In recent years, use of the mass spectrograph has been considered advantageous because of its great speed. In this instrument, gases, such as butane fractions, are introduced into an ionizing chamber, then subjected to an accelerating voltage which causes the ions so formed to pass through a powerful magnetic field, thus creating what is in effect a spectrum which subdivides ions of equal charge in accordance with their mass. In instruments of this type, serious difficulty has been experienced in recording the spectra; direct photography being employed initially, subsequently point by point measurements with a galvanometer having been employed and more recently photographic recording.

Since the intensity of ions extends through a wide range no single recorder is suitable for use with an instrument of this type, it being common practice to provide four recorders of different range operating simultaneously or to provide a single recorder with four ranges which the operator must preset on the basis of information obtained from a trail run. For example, in taking a record of $C_4$ fractions, a record might be taken on normal sensitivity during a portion of the spectra, at three times and ten times normal sensitivity in other portions, and at thirty times normal sensitivity during the remainder.

In modern instruments the ions are collected on a target placed within a Faraday cage which is shunted with a resistance of about 4000 megohms. This potential is fed to a direct current amplifier of high gain which operates a galvanometer; the deflection of the galvanometer mirror being employed to move a light beam across a photographic film and effect recording. Previous attempts to adapt this system to pen and ink recording have met with the difficulty that it has not been practicable to change the recorder range rapidly enough to follow the steep peaks of the mass spectrum. The present invention has surmounted this difficulty in a unique manner.

It is customary to scan the spectrum by slowly varying the accelerating potential which in effect causes the spectrum to sweep across the target in a horizontal direction. In the present invention, the analyzer tube is built with the main target within the Faraday cage, but with the additional provision of a small secondary target slightly in advance of the main target. Thus, as a spectrum is being scanned, the secondary target receives the spectrum in advance of the main target.

It is proposed to provide an additional amplifying system to amplify the ion current received by the secondary target and to have the output of this amplifier operate a number of selector relays capable of selecting in advance the desired instrument range for recording the subsequent mass peak. By providing a delay circuit, the actual operation of the relay may be held up until the mass amplifier has recorded the previous peak and has dropped in potential well below the previous maximum; the latter operation being accomplished by simply monitoring the output of the main amplifier and releasing the relay on the descending side of the voltage curve.

Therefore, the primary object of this invention resides in the provision of a novel spectrometer having a high speed recorder and a multiple range controller therefor.

Another object of this invention resides in the provision of a novel spectrometer tube that is provided with a pilot target that will supply a signal to the electrical system on the recorder ahead of the corresponding signal that it is desired to record, so that recording conditions will be set up whereby the record will not be allowed to go beyond the width of the recorder strip.

Still another object of this invention resides in the provision of a multiple range controller that is adapted for use with the novel spectrometer tube forming a part of the present invention.

This invention also contemplates the provision of a high speed recorder having an automatic multiple range recorder that is actuated by the pilot of a mass spectrometer tube.

Other objects and advantages of this invention will become apparent from the following description when considered with the drawings in which, Figure 1 is a schematic diagram of a novel spectrometer tube; power supply therefor; and the electrical recording system;

Figure 2 is a detailed circuit diagram of the multiple range controller for the high speed recorder;

Figure 3 is a curve plotted with amplitude of signal as ordinates and time as abscissa which represents a typical record made by a mass spectrometer; and Figure 4 is a curve similar to that shown in Figure 3 which illustrates the manner in which the range of the instrument is changed during the recording process.

Referring to the drawings in detail, particularly Figure 1, there is shown an analyzer tube 10 which is provided with an electron gun 11 at its upper end. Electron gun 11 is disposed within a gas chamber 12 that is formed by enlarging the upper end of the analyzer tube. A vacuum pump 13 communicates with the interior of the analyzer tube 10 by means of the passageway 14. Gas to be analyzed is admitted to the chamber 12 from a gas handling system 15 through the passageway 16.

The bottom end of the analyzer tube 10 is provided in the usual manner with a Faraday cage 17 and a target 18 that are disposed in an enlarged portion of the analyzer tube 10. In addition to the conventional Faraday cage and target, 17 and 18 respectively, a second Faraday cage 19 and a second target 20 are provided in a branch 21 of the analyzer tube 10. Branch 21 of the analyzer tube forms a Y with the lower portion of the tube. Tube 10 is disposed within pole pieces 22 of an electromagnet 23. A direct current power supply for the winding 24 of magnet 23 is supplied through conductors 25 by a power source 26 which may be a rectifier connected directly to a conventional alternating current power system not shown.

The electron gun 11 is powered in the usual way as shown in the drawings. Electrons emitted by the filament 27 in the ion source or chamber 12 are accelerated through the slit 28 of electrode 31 and slits 29 and 30 of electrode 32 of the electron gun and form the electron beam 33 as shown by the dotted lines. The voltage and current of this beam are very carefully controlled by the electrical system indicated schematically. The ions formed by the impact of the electrons on the gas molecules, which are below electrode 34, are urged through the long slit 34' in electrode 32 by a small potential difference between electrodes 34 and 32. The ion beam thus formed by the slit 34' is then accelerated by a much larger potential difference between electrodes 34 and 35, the latter being at ground potential. Passing through the slit 36 in electrode 35 the narrowly collimated beam enters the analyzer region of the tube 10, which is provided with a grounded metallic shield on the inside thereof. The beam thus far contains all the types of ions that were formed by the electron beam in the ionization region. At this point the ion beam is caused to pass between the pole pieces 22 of the electromagnet 23. As the magnetic field in this gap is perpendicular to this motion of the ions, the ions are bent into arcuate paths. Since the ions have different masses the radius of curvature of different types of ions will be different.

The ion accelerating voltage and the magnetic field can be adjusted so that ions of any desired mass will emerge from the magnetic field that is provided by the pole pieces 22 and pass through the exit slit 37 of the mass spectrometer to the target or collecting electrode 18.

The current reaching the electrode 18 flows through the conductor 38 and the resistance 39 to ground. The voltage drop developed across the resistance 39 is impressed upon the input of amplifier 40. After amplification by the amplifier 40 the signals are, by means of conductors 41, impressed upon a recorder range-control network 42. After passing through the range-control network the signals are conducted to a recorder 43 by conductors 44. By continually varying the ion accelerating potential or the magnetic field the entire mass spectrum of the ions can be caused to sweep the target 18 to give a record of the complete spectrum.

The operation of the device described to this point is that of the conventional mass spectrometer.

By providing the analyzer tube 10 with a Y branch 21 and an additional target 20 the accelerated ions can be caused to sweep the target 20 a predetermined time before they reach the target 18. Advantage can be taken of the foreknowledge thus gained of the character of the ion current to be detected by the target 18 to control the range of the recorder 43. Electrons detected by the pilot target 20 cause a current to flow through the conductor 45 and the resistance 46 to ground. The voltage drop developed across the resistance 46 is impressed on the input of a pilot signal amplifier 47.

Referring to Figure 2, the output signal from the amplifier 47 flows through the resistance 48 and the winding 49 of a relay 50. The armature 51 of relay 50 is pivoted at 52 and carries contacts 53 and 54. Contact 53 is connected through resistance 55 to the amplifier side of the resistance 48. Resistance 55, when the armature is actuated, completes a shunt circuit with the contact 56 for the resistance 48. Contact 54, when the armature 51 is in the down position, makes contact with a contact 57 that is connected to a conductor 58 whose function will be described hereafter. When the armature 51 is in the up position contact 54 connects with contact 59 to vary the range of the recorder 43 in a manner to be described. The signals from the amplifier 40 are admitted to the range-control network 42 through the conductors 41 which connect with conductors 60 and 61. Conductor 60 is connected through a resistance 62 to the contact 54 carried by the armature 51 of the relay 50. For recording signals of low amplitude the conventional recorder range is used and signals from the amplifier 40 are conducted through the circuit which comprises conductor 60, resistance 62, contacts 54 and 57, conductor 58, resistance 63 and conductor 61. The signals thus developed across the resistance 63 are impressed directly upon the recorder 43 by means of conductors 44.

When the signals delivered to the pilot amplifier 47 reach a predetermined value the output current from the amplifier flowing through the winding 49 of the relay 50 will actuate the relay to its upper position as shown by dashed lines. Actuation of the relay 50 places the shunt resistance 54 across the resistance 48 so that the holding voltage for the relay will be considerably higher than the release voltage. In this way the relay will not be allowed to trip until the signals delivered from the pilot amplifier 47 have decreased to a predetermined minimum value. When the relay armature 51 is in the position shown by dashed lines, contact 54 engages contact 59 to establish a new output signal circuit for the amplifier 40. The output circuit of the amplifier 40 then comprises conductor 60, resistance 62, contacts 54 and 59, and the impedance network comprising resistances 65, 66 and 63 and the conductor 61. Since the signal to be recorded is now applied across points formed by the junctions of resistances 65 and 66 and the junction of resistance 63 and resistance 65, the recorder 43 will now operate on a different range, Referring to Figure 3, it will be seen that when the scanning of the targets in the spectrometer tube is coordinated with time that a large peak in the signals is first detected by the pilot target at a time indicated by the dashed lines 67. The signal actually being recorded by the recorder at the time this peak is caused to scan the pilot target is that which was indicated by the pilot target an interval of time X earlier. The interval of time X can be conveniently varied by varying the rate of change of the magnetic field supplied by pole pieces 22 or the ion accelerating voltage.

In Figure 4 there is illustrated the type of record that would be recorded when the signal peak tends to exceed the width of the recorder strip. In making a record of this character, the recorder will operate on its normal range to the point A at which time the relay 50 would be actuated to change the range of the recorder. The recorder pan would move back toward zero to the point B. From the point B, the recorder continues to record on a new range to the point C. At C the signal voltage from the pilot amplifier has decreased to a point where the relay will no longer hold in actuated position and the normal range of the recorder is resumed. This causes the recorder pen to move across the scale from the zero point in a direction of increased signal to the point D from which it will trace the remainder of the curve while utilizing the normal range of the recorder.

It is to be understood that the recorder 43 may be any of the conventional pen type recorders. Additionally, the recorder 43 may be of the type commonly known and referred to as a potentiometer type recorder.

I claim:

1. A mass spectrometer of the scanning type comprising in combination a source of an ion stream, means for dispersing said ion stream in accordance with the mass of the ions to form a mass spectrum, a main target therefor, means to sweep the spectrum across said target, an auxiliary target disposed within the path of said sweeping spectrum but between the original position of said spectrum and said main target, whereby a portion of said spectrum undergoing deflection will strike said auxiliary target before striking said main target, means to amplify the electrical signals produced by said main target as said spectrum is directed thereacross, means to record said amplified signals, and means actuated by the electrical signals produced by the auxiliary target to control the recording of the electrical signals produced by the main target.

2. A mass spectrometer of the scanning type comprising in combination a source of an ion stream, means for dispersing said ion stream in accordance with the mass of the ions to form a mass spectrum, a main target therefor, means to sweep the spectrum across said target, an auxiliary target disposed within the path of said sweeping spectrum but between the original position of said spectrum and said main target, whereby a portion of said spectrum undergoing deflection will strike said auxiliary target before striking said main target, means to amplify the electrical signals produced by said main target as said spectrum is directed thereacross, means to record said amplified signals, means actuated by the electrical signals produced by the auxiliary target to control the recording of the electrical signals produced by the main target, and means for delaying the controlling action of the control means a predetermined period of time.

3. A mass spectrometer of the scanning type comprising in combination a source of an ion stream, means for dispersing said ion stream in accordance with the mass of the ions to form a mass spectrum, a main target therefor, means to sweep the spectrum across said target, an auxiliary target disposed within the path of said sweeping spectrum but between the original position of said spectrum and said main target, whereby a portion of said spectrum undergoing deflection will strike said auxiliary target before striking said main target, means to amplify the electrical signals produced by said main target as said spectrum is directed thereacross, means to record the amplified signals, and control means interposed between said amplifying means and said recording means to change the range of said recording means when the signal strength reaches a pretermined value, said control means being actuated by electrical signals produced by said auxiliary target when the spectrum is directed thereacross.

4. A mass spectrometer of the scanning type comprising in combination a source of an ion stream, means for dispersing said ion stream in accordance with the mass of the ions to form a mass spectrum, a main target therefor, means to sweep the spectrum across said target, an auxiliary target disposed within the path of said sweeping spectrum but between the original position of said spectrum and said main target, whereby a portion of said spectrum undergoing deflection will strike said auxiliary target before striking said main target, means to amplify the electrical signals produced by said main target as said spectrum is directed thereacross, means to record the amplified signals, control means interposed between said amplifying means and said recording means to change the range of said recording means when the signal strength reaches a predetermined value, said control means being actuated by electrical signals produced by said auxiliary target when the spectrum is directed thereacross, and means for delaying the change in range a period of time equal to that required for that portion of the spectrum which swept the auxiliary target to produce the signals which actuated said control means to reach the main target.

5. A mass spectrometer of the scanning type comprising in combination a source of an ion stream, means for dispersing said ion stream in accordance with the mass of the ions to form a mass spectrum, a main target therefor, means to sweep the spectrum across said target, an auxiliary target disposed within the path of said sweeping spectrum but between the original position of said spectrum and said main target, whereby a portion of said spectrum undergoing deflection will strike said auxiliary target before striking said main target, means to amplify the electrical signals produced by said main target as said spectrum is directed thereacross, means to record said amplified signals, means to amplify the electrical signals produced by the auxiliary target as said spectrum is directed thereacross, and control means actuated by said amplified signals from the auxiliary target to control the recording of the signals produced by the main target.

6. A mass spectrometer of the scanning type comprising in combination a source of an ion stream, means for dispersing said ion stream in accordance with the mass of the ions to form a mass spectrum, a main target therefor, means to sweep the spectrum across said target, an auxiliary target disposed within the path of said sweeping spectrum but between the original position of said spectrum and said main target, whereby a portion of said spectrum undergoing deflection will strike said auxiliary target before striking said main target, means to amplify the electrical signals produced by said main target as said spectrum is directed thereacross, means to record said amplified signals, means to amplify the electrical signals produced by the auxiliary target as said spectrum is directed thereacross, control means actuated by said amplified signals from the auxiliary target to control the recording of the signals produced by the main target, and means for controlling the action of said control means a predetermined period of time.

7. A mass spectrometer comprising in combination an analyzer tube, means for producing ions in said tube, means for directing and accelerating the ions along the tube, means for producing a magnetic field in the path of said ions for dispersing the ions in accordance with their mass to form a mass spectrum, a main ion target disposed in the path of the dispersed ions, an auxiliary target also disposed in the path of the dispersed ions, means for causing the spectrum formed by the dispersion of the ions to scan the targets, said target being so disposed that the auxiliary target will be scanned a predetermined period of time ahead of the main target, means for amplifying and recording on a limited width of recorder strip the current produced by the ion bombardment of the main target, means for amplifying the current produced by the ion bombardment of the auxiliary target, and means disposed between the first amplifying means and the recorder adapted to be actuated by said amplified auxiliary target current for changing the range of the recorder, whereby strong currents which would not normally be recorded on the recorder strip of limited width would be recorded thereon.

8. In a mass spectrometer analyzer tube having an arcuate body portion, an electron gun and ion accelerating electrodes in one end thereof to produce an ion stream when a sample of gas is admitted to the electron gun and accelerating electrode area, means for evacuating said tube, means for admitting a gas sample into the electron gun and accelerating electrode area, an ion target disposed in the opposite end of said tube, means for dispersing said ion stream to form a mass spectrum, means for causing the spectrum to scan said target, the improvement which comprises an auxiliary target, said auxiliary target being disposed in the locus of said scanning spectrum so that it will be scanned ahead of the main target, means for separately detecting electrical signals produced by the main target and auxiliary target, means for amplifying and recording the detected signals from the main target, and control means for the recording means actuated by the detected signals from the auxiliary target, whereby the recorder range can be changed to accommodate signals of widely varying amplitudes.

9. In a mass spectrometer analyzer tube having an arcuate body portion, an electron gun and ion accelerating electrodes in one end thereof to produce an ion stream when a sample of gas is admitted to the electron gun and accelerating electrode area, means for evacuating said tube, means for admitting a gas sample into the electron gun and accelerating electrode area, an ion target disposed in the opposite end of said tube, means for dispersing said ion stream to form a mass spectrum, means for causing the spectrum to scan said target, the improvement which comprises an auxiliary target, said auxiliary target being disposed in the locus of said scanning spectrum so that it will be scanned ahead of the main target, means for separately detecting electrical signals produced by the main target and auxiliary target, means for amplifying and recording the detected signals from the main target, means for amplifying the detected signals from the auxiliary target, and control means for the recording means actuated by the amplified signals from the auxiliary target, whereby the recorder range can be changed to accommodate signals of widely varying amplitudes.

10. In a mass spectrometer analyzer tube having an arcuate body portion, an electron gun and ion accelerating electrodes in one end thereof to produce an ion stream when a sample of gas is admitted to the electron gun and accelerating electrode area, means for evacuating said tube, means for admitting a gas sample into the electron gun and accelerating electrode area, an ion target disposed in the opposite end of said tube, means for dispersing said ion stream to form a mass spectrum, means for causing the spectrum to scan said target, the improvement which comprises an auxiliary target, said auxiliary target being disposed in the locus of said scanning spectrum so that it will be scanned ahead of the main target, means for separately detecting electrical signals produced by the main target and auxiliary target, means for amplifying and recording the detected signals from the main target, control means actuated by the detected signals from the auxiliary target, whereby the recorder range can be changed to accommodate signals of widely varying amplitudes, and means for delaying the operation of the control means a predetermined period of time.

11. A mass spectrometer comprising in combination an analyzer tube, means for producing ions in said tube, means for directing and accelerating the ions along the tube, means for producing a magnetic field in the path of said ions for dispersing the ions in accordance with their mass to form a mass spectrum, an ion target, means for causing the spectrum formed by the dispersion of the ions to scan the target, means for amplifying and recording on a limited width of recorder strip the current produced by the ion bombardment of the target, and means responsive to the intensity of ions in the scanning spectrum to change the recorder response to ion intensities of a predetermined level before said ions scan said target.

CARLETON H. SCHLESMAN.

REFERENCES CITED

The following references are of record in the file of this patent:

UNITED STATES PATENTS

| Number | Name | Date |
|---|---|---|
| 2,341,551 | Hoover | Feb. 15, 1944 |
| 2,380,439 | Hoskins et al. | July 31, 1945 |
| 2,400,190 | Clark | May 14, 1946 |